United States Patent [19]

Hanna et al.

[11] Patent Number: 5,566,251
[45] Date of Patent: Oct. 15, 1996

[54] VIDEO MERGING EMPLOYING PATTERN-KEY INSERTION

[75] Inventors: Keith J. Hanna; Peter J. Burt, both of Princeton, N.J.

[73] Assignee: David Sarnoff Research Center, Inc, Princeton, N.J.

[21] Appl. No.: 456,020

[22] Filed: May 31, 1995

Related U.S. Application Data

[63] Continuation of Ser. No. 115,810, Sep. 3, 1993, abandoned, which is a continuation of Ser. No. 942,877, Sep. 10, 1992, abandoned.

[30] Foreign Application Priority Data

Sep. 18, 1991 [GB] United Kingdom ............... 9119964

[51] Int. Cl.$^6$ ........................................................ G06K 9/36
[52] U.S. Cl. ...................... 382/284; 382/173; 382/103; 382/282; 382/295; 348/589; 348/590; 348/588
[58] Field of Search ...................................... 382/100, 173, 382/103, 282, 295, 298, 284; 395/118, 133, 135, 127; 348/578, 580, 584, 588, 589, 590, 593

[56] References Cited

U.S. PATENT DOCUMENTS

| | | | |
|---|---|---|---|
| 4,393,394 | 7/1983 | McCoy | 358/183 |
| 4,409,611 | 11/1983 | Vlahos | 358/22 |
| 4,539,585 | 9/1985 | Spackova et al. | 358/183 |
| 4,589,013 | 5/1986 | Vlahos | 358/22 |
| 4,625,231 | 11/1986 | Vlahos | 358/22 |
| 4,752,828 | 6/1988 | Chapuis et al. | 358/183 |
| 4,947,256 | 8/1990 | Wood et al. | 348/578 |
| 5,032,901 | 7/1991 | Vlahos | 358/22 |
| 5,063,603 | 11/1991 | Burt | 382/37 |
| 5,067,014 | 11/1991 | Bergen | 358/105 |
| 5,077,610 | 12/1991 | Searby et al. | 358/183 |
| 5,099,337 | 3/1992 | Cury | 358/335 |
| 5,126,847 | 6/1992 | Kori et al. | 358/183 |
| 5,264,933 | 11/1993 | Rosser et al. | 348/578 |
| 5,353,392 | 10/1994 | Luquet et al. | 395/127 |

FOREIGN PATENT DOCUMENTS

| | | | |
|---|---|---|---|
| 893095448 | 9/1989 | European Pat. Off. | G06F 15/62 |
| 9004663 | 10/1990 | France | H04N 5/262 |
| 9100296 | 4/1991 | France | H04N 5/262 |
| 9000925 | 6/1990 | United Kingdom | H04N 9/80 |
| 91/05174 | 7/1991 | WIPO . | |
| 9302524 | 2/1993 | WIPO | H04N 5/272 |

OTHER PUBLICATIONS

Patent Abstracts Of Japan vol. 15, No. 98 (E-1042)8 Mar. 1991 & JP-A-02 306 782 (Asutoro Design K. K.) 20 Dec. 1990.

Nakamura et al., "High Quality Montage Pictures by a New Color Killer Soft Chromakey System", SMPTE Journal, vol. 90, Feb. 1981, p. 107.

Burt "Smart Sensing Within a Pyramid Vision Machine" in the Proc. IEEE, vol. 76, No. 8, Aug. 1988, pp. 1006–1015.

Bergen et al "Hierarchical Model–Based Motion Estimation" in the Proc. European Conference on Computer Vision, 1992, pp. 237–252.

(List continued on next page.)

Primary Examiner—Leo Boudreau
Assistant Examiner—David R. Anderson
Attorney, Agent, or Firm—W. J. Burke

[57] ABSTRACT

Disclosed is a technique for deriving a composite video image by merging foreground and background video image data supplied from a plurality of separate video signal sources employing pattern-key insertion, rather than prior-art color-key insertion, for this purpose. Pattern-key insertion involves replacing a first pattern in a video scene with a second pattern. This is accomplished by first detecting the first pattern in the video scene and estimating the pose of this detected first pattern with respect to a reference object in the video scene. The second pattern is then geometrically transformed using the pose estimate of the detected first pattern. Finally, the detected first pattern is replaced with the geometrically-transformed second pattern.

5 Claims, 7 Drawing Sheets

OTHER PUBLICATIONS

Burt et al. "Object Tracking With A Moving Camera: An Application Of Dynamic Motion Analysis" in the Proc. IEEE Workshop On Visual Motion, Irvine, CA, Mar. 20–22, 1989.

Burt et al. "Dynamic Analysis Of Image Motion For Vehicle Guidance" in the Proc IEEE Workshop On Intelligent Motion Control, Istanbul, Turkey, 20–22 Aug. 1990.

Bergen et al. "Computing Two Motions From Three Frames" in the Proc. 3rd International Conference On Computer Vision, Osaka, Japan, Dec. 4–7, 1990.

VIDEO MERGING EMPLOYING PATTERN-KEY INSERTION

This is a continuation of application Ser. No. 08/115,810 filed Sep. 3, 1993 now abandoned which is a continuation of application Ser. No. 07/942,877 filed on Sep. 10, 1992 and now abandoned.

The invention relates to a technique for deriving a composite video image by merging foreground and background video image data supplied from a plurality of separate video signal sources and, more particularly, a technique employing pattern-key insertion for this purpose.

BACKGROUND OF THE INVENTION

Means for merging two or more video signals to provide a single composite video signal is known in the art. An example of such video merging is presentation of weather-forecasts on television, where a weather-forecaster in the foreground is superimposed on a weather-map in the background.

Such prior-art means normally use a color-key merging technology in which the required foreground scene is recorded using a colored background (usually blue or green). The required background scene is also recorded. In its simplest form, the color-key video merging technique uses the color of each point in the foreground scene to automatically "hard" switch (i.e., binary switch) between the foreground and background video signal. The color-key video merging technique uses the color of each point in the foreground scene to automatically switch between the foreground and background video signal. In particular, if a blue pixel is detected in the foreground scene (assuming blue is the color key), then a video switch will direct the video signal from the background scene to the output scene at that point. If a blue pixel is not detected in the foreground scene, then the video switch will direct the video from the foreground scene to the output scene at that point. After all points have been processed in this way, the result is an output scene which is a combination of the input foreground and background scenes.

More complex "soft" forms of the color-key video merging technique are taught in the article by Nakamura et al., in an article in SMPTE Journal, Vol. 90, Feb. 1981, p. 107 and in U.S. Pat. No. 4,409,611. In these more complex forms of the color-key video merging technique, the effects of switching may be hidden and more natural merging may be achieved. For instance, shadows of foreground subjects may be made to appear in the background.

The color-key merging technique is simple, and cheap hardware for this method has been available for some time. As a result, color-key insertion can be performed on both recorded and live video. It is used widely in live television for such purposes as superimposing sports results or images of reporters on top of background scenes, and in the film industry for such purposes as superimposing foreground objects (like space-ships) onto background scenes (like space-scenes).

However, there are two important limitations of color-key merging technology. First, this technique cannot be used to combine video sources where the separation color (e.g., blue or green) in the scene cannot be controlled by the employer of this technology. This has often limited the use of color-key insertion to image sequences recorded in a broadcasting or film studio. Second, it is not currently possible to automatically combine video signals in such a way that patterns inserted from one sequence follow the motion of objects (foreground or background) in the other sequence so that the inserted patterns appear to be part of these objects. While, in the past, synchronization of the motions of background and foreground scenes has been performed manually in a very limited number of film productions, such manual synchronization is highly expensive and tedious and requires that the video material be prerecorded and not 'live'.

The prior art includes a dynamic pattern recognition method which employs a hierarchical structured search for detecting a pattern within a video scene. An example of the use of this method is described in U.S. Pat. No. 5,063,603, the teachings of which are incorporated herein by reference. Briefly, this dynamic pattern recognition method consists of representing a target pattern within a computer as a set of component patterns in a "pattern tree" structure. Components near the root of the tree typically represent large scale features of the target pattern, while components away from the root represent progressively finer detail. The coarse patterns are represented at reduced resolution, while the detailed patterns are represented at high resolution. The search procedure matches the stored component patterns in the pattern tree to patterns in the scene. A match can be found, for example, by correlating the stored pattern with the image (represented in a pyramid format). Patterns are matched sequentially, starting at the root or the tree. As a candidate match is found for each component pattern, its position in the image is used to guide the search for the next component. In this way a complex pattern can be located with relatively little computation.

Further, it is known in the prior art how to estimate the orientation of a flat surface of a given detected pattern in a scene depicted in a video image. The particular parameters that need to be determined are the position of the given detected pattern in the scene, its scale and orientation in the plane of the image, and its tilt into the image plane. Pose is estimated by measuring the geometric distortions of other "landmark" patterns on or near the given detected pattern. Pose may be estimated in two steps.

The first step is to make a rough estimate of pose by locating three or more of such landmark patterns in the scene that are on or near the given detected pattern. The positions of these landmark patterns relative to the given detected pattern are known from training images. However, the positions of these landmark patterns relative to one another change with changes in pose of the given detected pattern. Therefore, the relative positions of the landmark patterns in the observed scene can be used to determine that pose. Landmark patterns can be located using hierarchical structured search, as described above.

The second step, which refines makes use of "locator patterns" that are on or near the given detected pattern. These "locator patterns" are more extensive patterns than are typically used as landmarks. Stored copies of the pattern are matched to the scene through a process that successively estimates position and orientation, and a process that warps the stored copies into alignment with the observed patterns in the scene. This alignment process, known in the art and called herein "affine precise alignment estimation," can provide a very precise estimate of the pattern positions, and hence of the pose of the given detected pattern. The affine precise alignment estimation process is described in various publications, including "Hierarchical Model-Based Motion Estimation" in the Proc. European Conference on Computer Vision, 1992, pp. 237–252, by Bergen et al and U.S. Pat. No. 5,067,014 to Bergen et al. and assigned to the assignee of this invention.

SUMMARY OF THE INVENTION

The invention is a technique and apparatus for deriving a composite video image by merging foreground and background video image data supplied from a plurality of separate video signal sources, in which pattern-key insertion is used for this purpose. More specifically, the technique replaces a first pattern in a video scene with a second pattern by first detecting the first pattern in the video scene and estimating the pose of this detected first pattern with respect to a reference object in the video scene. The second pattern is then geometrically transformed using the pose estimate of the detected first pattern. Finally, the detected first pattern is replaced with the geometrically-transformed second pattern. The apparatus of the invention is also means for detecting a first pattern in a video scene, means for estimating the pose of this detected first pattern with respect to a reference object-in the video scene, means for geometrically transforming the second pattern using the pose estimate of the detected first pattern, and means for replacing the detected first pattern with the geometrically-transformed second pattern.

DESCRIPTION OF THE PREFERRED EMBODIMENTS

Elements common to different Figures have the same numerical designation in each Figure.

Each of FIGS. 1–5 includes a video switch for merging foreground and background scenes into an output scene. For illustrative purposes, each of these video switches is assumed to be a "hard" switch. However it should be understood that a "soft" switch, of a type known in the prior art discussed above, could be used instead.

Figure 1:
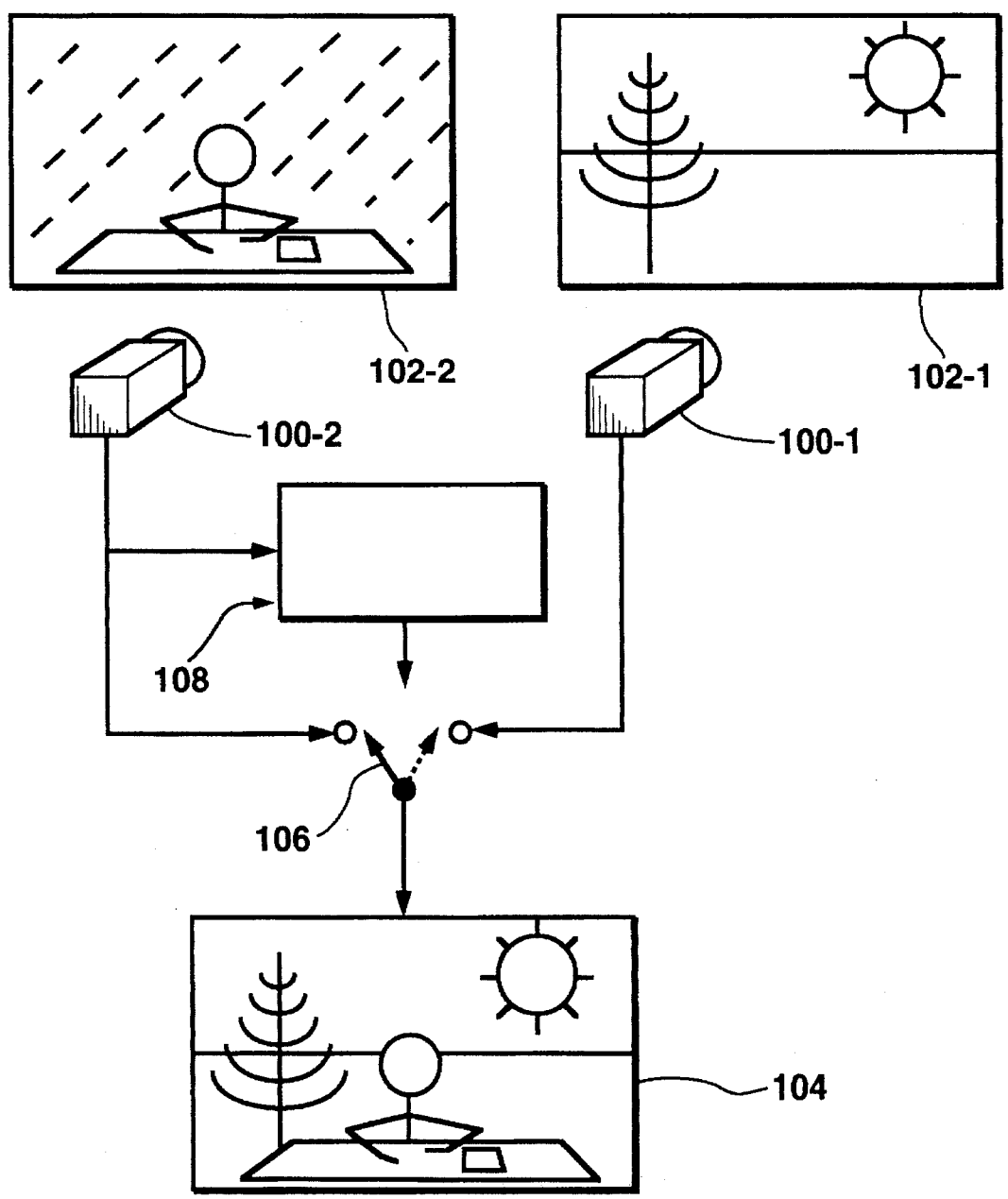
FIG. 1 illustrates the prior-art color-key insertion technique.

In FIG. 1, an example of the prior-art color-key insertion technique is shown. The video output pixels of each of a sequence of successive image frames being recorded by camera 100-1 that is viewing background scene 102-1 (which comprises the sun and a tree) in real time (or, alternatively, such output pixels of a video playback device that is playing back previously recorded background scene 102-1) are forwarded to output scene 104 through video switch 106 whenever the output from means 108 indicates that means 108 is detecting blue pixels, assuming blue is the key color. The video output pixels of each of a sequence of successive image frames being recorded by camera 100-2 that is viewing foreground scene 102-2 (which comprises a person sitting at a desk, which are situated in front of a blue screen) in real time (or, alternatively, such output pixels of a video playback device that is playing back previously recorded foreground scene 102-2) are forwarded to output scene 104 through video switch 106 are applied as an input to both video switch 106 and means 108. Therefore, video switch 106 forwards background scene 102-1 to output scene 104 only when the video output pixels of camera 100-2 constitute the blue pixels of the blue screen, and forwards foreground scene 102-2 to output scene 104 when the video output pixels of camera 100-2 constitute the non-blue pixels of the person sitting at a desk. Therefore output scene 104 constitutes the video output pixels of each of a sequence of successive composite image frames of the merged sun and a tree of background scene 102-1 and the person sitting at a desk of foreground scene 102-2.

The invention is a technique, known as "pattern-key insertion", used to replace a predetermined pattern present in a background scene with an inserted substitute pattern present in a foreground scene. FIGS. 2–5 show different examples of replacement, with the simplest example being shown in FIG. 2 and more complex examples being shown in FIGS. 3–5, respectively. Each of the examples shown in FIGS. 2–5 will first be described in general. Thereafter, the specific operation of the structure functionally shown in these figures will be discussed in more detail.

Figure 2:
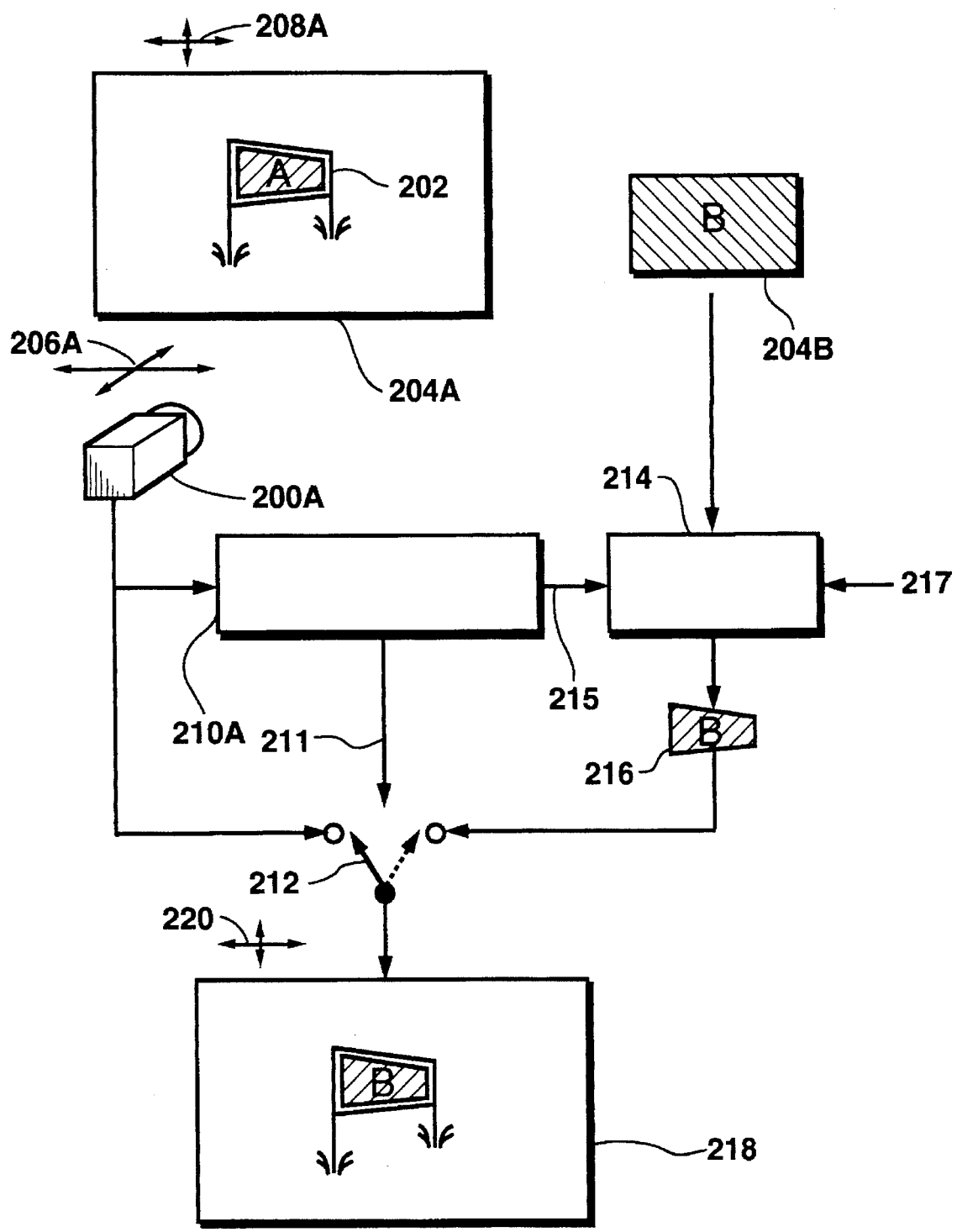
FIGS. 2, 3, 4 and 5 illustrate examples of the pattern-key insertion technique of the invention.

In FIG. 2, camera 200A records in real time a sequence of successive 2-dimensional video image frames of physical 3-dimensional objects, such as billboard 202, situated in background scene 204A (or, alternatively, this sequence of 2-dimensional successive image flames of a video playback device that is playing back previously recorded background scene 204A). Illustratively, billboard 202 is assumed immovable, but camera 200A is movable both to the left and to the right and toward and away from the objects, including billboard 202, that comprise background scene 204A, as indicated by arrowed lines 206A. This will result in the orientation and scale of each of the sequence of video images of billboard 202 in background scene 204A changing in correspondence with the movement of camera 200 from one position to another, as indicated by arrowed lines 208A.

Billboard 202 in background scene 204A comprises striped logo pattern "A". It is desired to replace striped logo pattern "A" of background scene 204A with immovable striped logo pattern "B" of foreground scene 204B, which logo pattern "B" is assumed in FIG. 2 to be a fixed object defined by a video clip or single still picture. This is accomplished by means 210A which, in response to the video output of camera 200A applied as an input thereto, performs the functions of (1) detecting logo pattern "A" and (2) estimating the pose of detected logo pattern "A" (i.e., estimating the orientation, scale and perspective parameters of logo pattern "A" in each of the sequence of successive 2-dimensional video image frames of background scene 204A with respect to the image of one or more reference objects, such as billboard 202 itself) in that video image frame.

In accordance with the above assumption that video switch 212 is a "hard" switch, means 210A provides a "no pattern A/pattern A" output 211 from means 210A, which is indicative of the presence or absence of detected pixels of logo pattern "A" in the video output from camera 200A, that is used to control the operation of video switch 212 (which performs the same function as video switch 106 in FIG. 1). In the case in which video switch 212 is a "soft" switch, rather than a "hard" switch, the binary "no pattern A/pattern A" output 211 from means 210A, which provides a sharp edge between logo pattern "A" and logo pattern "B", is replaced by a soft edge in which logo pattern "A" blends into logo pattern "B", as described in the above-discussed prior art.

Means 214, responsive to a "pose information" (i.e., orientation, scale, perspective distortion, etc. parameters of detected logo pattern "A") input 215 from means 210A and the one-time selection via input 217 of manually-selected size, shape, orientation, etc. parameters of logo pattern "B" itself performs the function of geometrically transforming the orientation and scale of logo pattern "B" of foreground scene 204B to match the orientation and scale of the estimated pose of logo pattern "A" in the current image frame (as indicated by diagram 216 in FIG. 2). The operation of video switch 212 merges the video output of camera 200 with the geometrically-transformed logo pattern "B" to result in output scene 218, wherein logo pattern "A" is replaced by inserted logo pattern "B". Thus, the pose of logo pattern "B" in output scene 218 changes in correspondence with the movement of camera 200 from one position to another, as indicated by arrowed lines 220.

Figure 3:
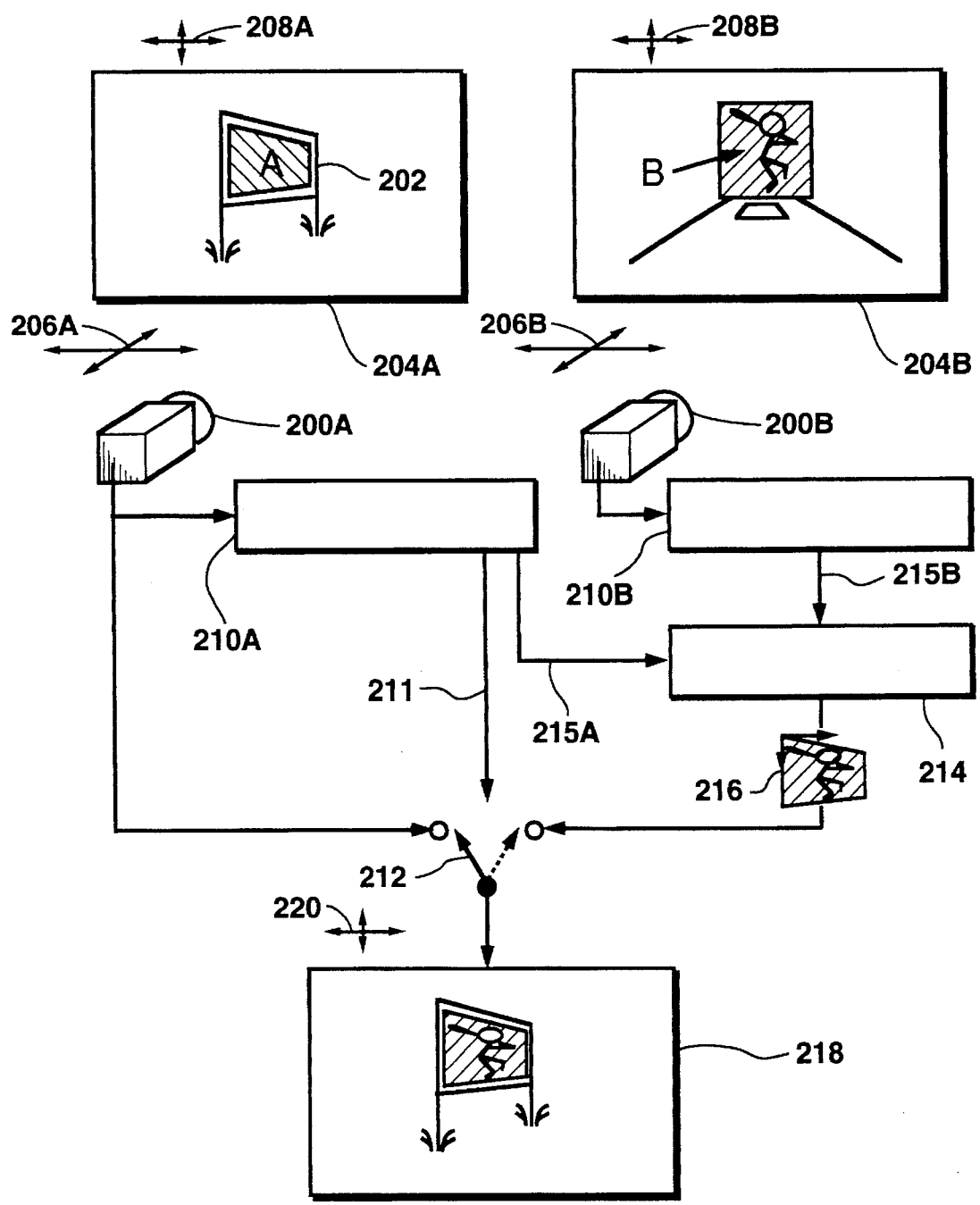

In FIG. 3, the example is directed to the replacement of a predetermined pattern, such as striped logo pattern "A", present in a sequence of successive video image frames of background scene 204A, with an inserted substitute inherently movable pattern, such as movable striped logo pattern "B" (a baseball player at bat), present in a sequence of successive video image flames of foreground scene 204B derived from camera (or video playback device) 200B, wherein camera 200B is itself also movable. Because striped logo pattern "B" is inherently movable, it is possible that at times camera 200B may view only a portion of logo pattern "B", e.g., only the head of the baseball player (which head may be used as a reference pattern for logo pattern "B", as described below). For this reason, the object-insertion pattern-key insertion technique of FIG. 2 cannot be used. Instead, a motion-adaptive video-insertion pattern-key insertion technique is required in FIG. 3 (as well as in FIGS. 4–5 to be described below).

More specifically, it is apparent that motion in a sequence of video image frames derived from camera 200B may be due to motion in one or both of camera 200B itself (as indicated by arrowed lines 206B) and the combined motion of both logo pattern "B" in foreground scene 204B and camera 200B (as indicated by arrowed lines 208B). Means 210B which, in response to the video output of camera 200B applied as an input thereto, performs the functions of (1) detecting logo pattern "B" and (2) estimating the pose of detected logo pattern "B" (i.e., estimating the orientation, scale and perspective parameters of logo pattern "B" in each of the sequence of successive 2-dimensional video image frames of foreground scene 204B with respect to the image of a reference pattern, such as the head of the baseball player) in that video image frame of camera 200B. The pose information derived by means 210B is applied as a first input to geometric transform means 214. Means 210A, which performs the same functions in FIG. 3 as described above in connection with FIG. 2, applies the pose information derived thereby as a second input 215A to geometric transform means 214.

Geometric transform means 214 uses the pose information from means 210B applied as a first input 215B thereto to compute a stabilized transformed image of logo pattern "B" for which the reference pattern (i.e., the head of the baseball player) constitutes a fixed origin. A fixed origin means that in the stabilized transformed image of the baseball player of logo pattern "B", the reference pattern (i.e., the head of the baseball player) appears fixed in position in each of the sequence of image frames, even though this reference pattern is moving in foreground scene 204B Geometric transform means 214 then uses the pose information from means 210A applied as a second input 215A thereto to transform the pose of the stabilized transformed image of logo pattern "B" in the manner described above in connection with FIG. 2 to provide the pose shown in diagram 216. The pose shown in diagram 216 is now inserted in output scene 218 by video switch 212 using the "no pattern A/pattern A" output 211 from means 210A. The result is that camera 200B recording foreground scene 204B and camera 200A recording background scene 204A can move independently of one another and a sequence of image frames of inherently movable logo pattern "B" of foreground scene 204B can still be inserted onto a sequence of image frames of logo pattern "A" of background scene 204A, thereby replacing logo pattern "A" in output scene 218.

Figure 4:
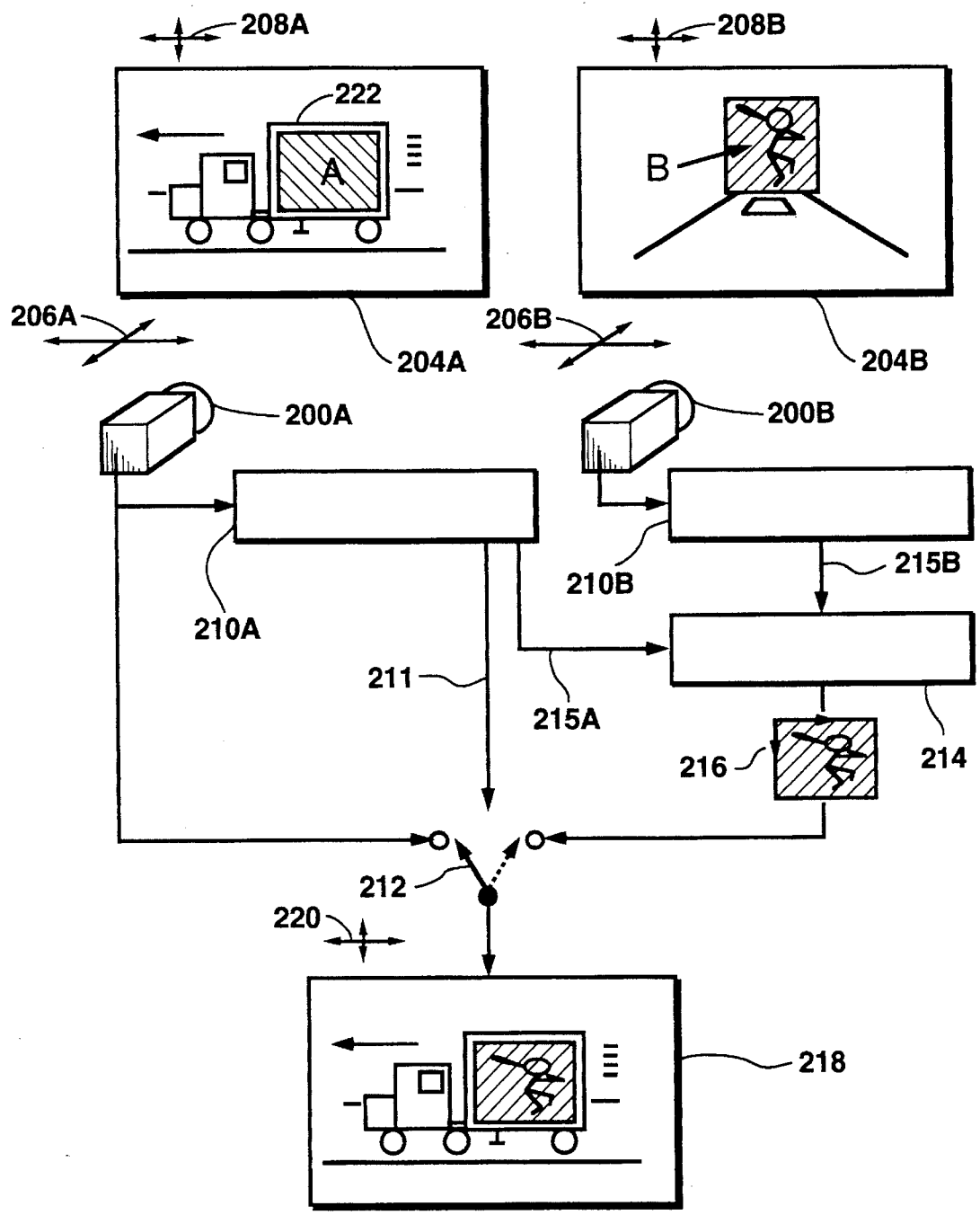

In FIGS. 2 and 3, it has been assumed that physical 3-dimensional billboard 202 containing logo pattern "A" is immovable in background scene 204A. In the example of FIG. 4, it is assumed that physical 3-dimensional movable truck 222 contains logo pattern "A", and it is desired to replace logo pattern "A" with the same independently movable foreground-scene 204B logo pattern "B" (a baseball player) as in FIG. 3. Other than the fact that the detection of logo pattern "A" by means 210A in a sequence of image frames of background scene 204A is affected by the movement of truck 222 relative to other objects that may be present in background scene 204A, and the pose information from means 210A applied as a second input to geometric transform means 214 must provide information pertaining thereto, the implementation of FIG. 4 is substantially similar to that of FIG. 3.

Figure 5:
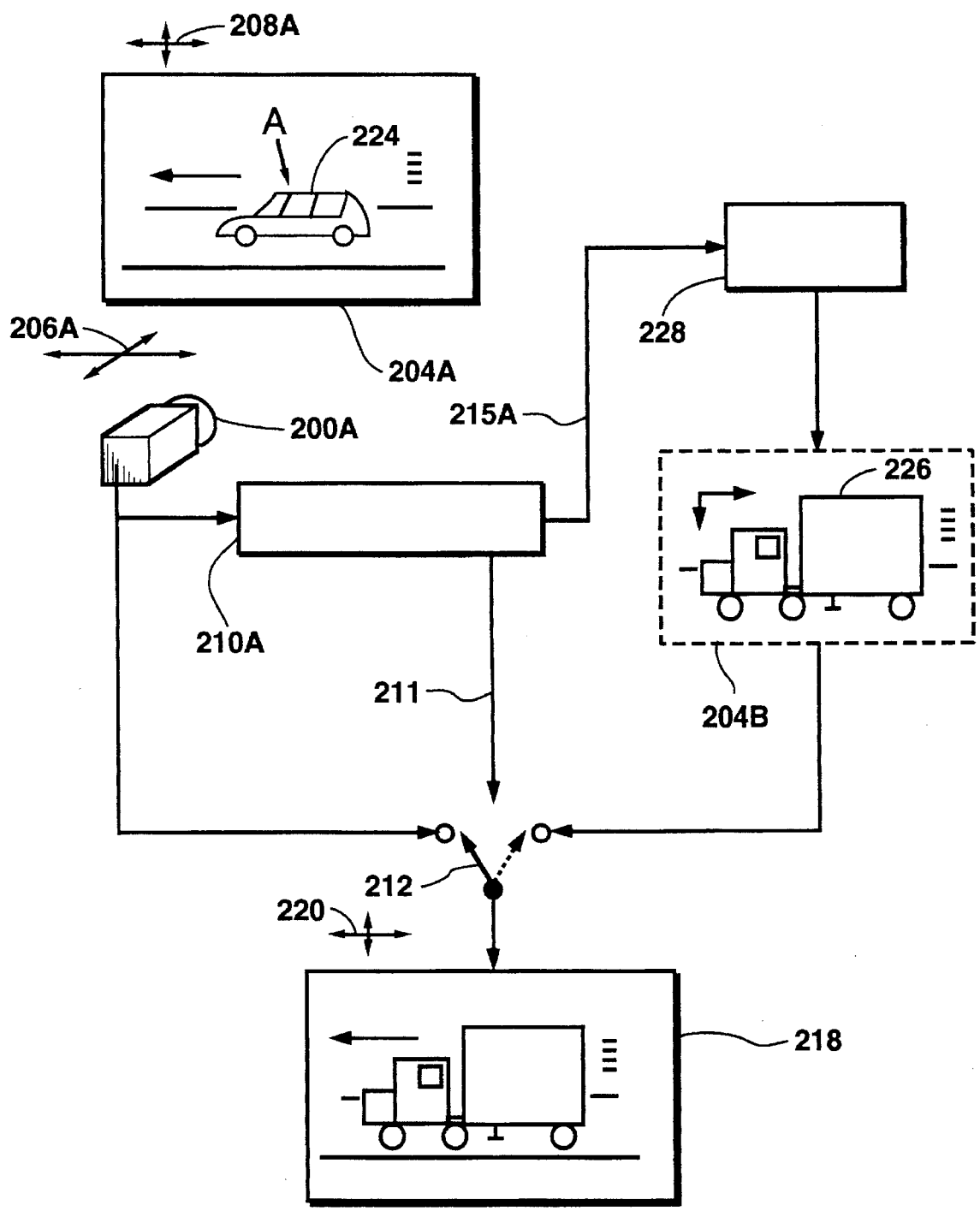

In FIG. 5, it is desired to replace physical 3-dimensional moving automobile 224 in background scene 204A with the pattern of truck 226 from a foreground scene 204B in output scene 218. In principle, the design and implementation of pattern-key insertion described above in connection with FIGS. 3 and 4 could be used without modification to implement FIG. 5 pattern insertion, but modifications might be necessary to make the insertion appear highly realistic in all viewing circumstances. For example, the orientation of automobile 224 in the in the image-frame background sequence of background scene 204A might change so much throughout the sequence, that no geometrical transform of a replacement video of truck 226 can make the inserted video look realistic. To illustrate this, imagine a side-on view of truck 226 as the replacement video, and a front-on view of automobile 224 as the background video. The goal is to replace automobile 224 with truck 226. Such replacement cannot be performed realistically, since the side-on view of the truck contains no information on the image of the front-view of the truck. One way of solving this problem is to obtain a set of images of the truck recorded from different view-points, and then geometrically transform that recorded image that will give the best replacement image. An alternative solution is shown in FIG. 5. In this case, graphics generator 228, which includes geometric transform means, has pose information about automobile 224 derived by means 210A applied as an input 215A thereto. This permits graphics generator 228 to produce a computationally rendered or generated image of truck 226 in the correct pose as a replacement scene 204B, in which the image of moving automobile 224 is replaced in background scene 204A by an image of moving truck 226.

The operation of means 210 A, 210B and 214 in FIGS. 2, 3, 4 and/or 5 needed to provide pattern-key insertion, which will now be described, makes use of prior-art techniques discussed above.

Specifically, in the system of FIG. 2, an operator designates an arbitrary target pattern (logo pattern "A") in one video sequence. That corresponds to a stationary object (billboard 202) in background scene 204A. Means 210A of FIG. 2 monitors that sequence continuously; whenever the target pattern is found (detected), it is replaced by a replacement pattern or video (logo pattern "B") taken from a second sequence. The effect of insertion is that the replacement pattern (or video) can be made to appear as part of an object in the first sequence when the target pattern moves in the image due solely to motion of the camera. Thus, camera 200A recording background scene 204A can move across the scene containing logo pattern "A", and logo pattern "B" will remain correctly positioned on top of logo pattern "A" in the output sequence.

More generally, it is often difficult for means 210A to track certain background regions (like the middle of a featureless tennis court) simply because the pattern is not easily distinguished from other similar (or identical) patterns in the background scene. Secondary region tracking overcomes this problem. Instead of means 210A tracking the pattern on which video is to be inserted (the target pattern), a second "landmark" pattern that is easily distinguishable from any other pattern in the background scene can be tracked. The precise location of the landmark pattern in the background scene can then be used to infer the precise location of the target pattern.

Landmark region tracking requires a method for inferring the precise location of the target pattern from the landmark pattern. In means 210A, the coordinate position of the landmark pattern is subtracted from the coordinate position of the target pattern in a single reference image in the background sequence to obtain a difference vector. The difference vector is then added to the recovered location of the landmark pattern to estimate the position of the target pattern throughout the derivation of the foreground sequence. Put simply, the positional relationship between the landmark and target patterns is assumed to remain translationally fixed (but may still permitted to rotate and/or zoom with respect to one another) throughout the derivation of the foreground sequence, so the location of the target pattern can be inferred if the landmark pattern can be found.

Figure 6:
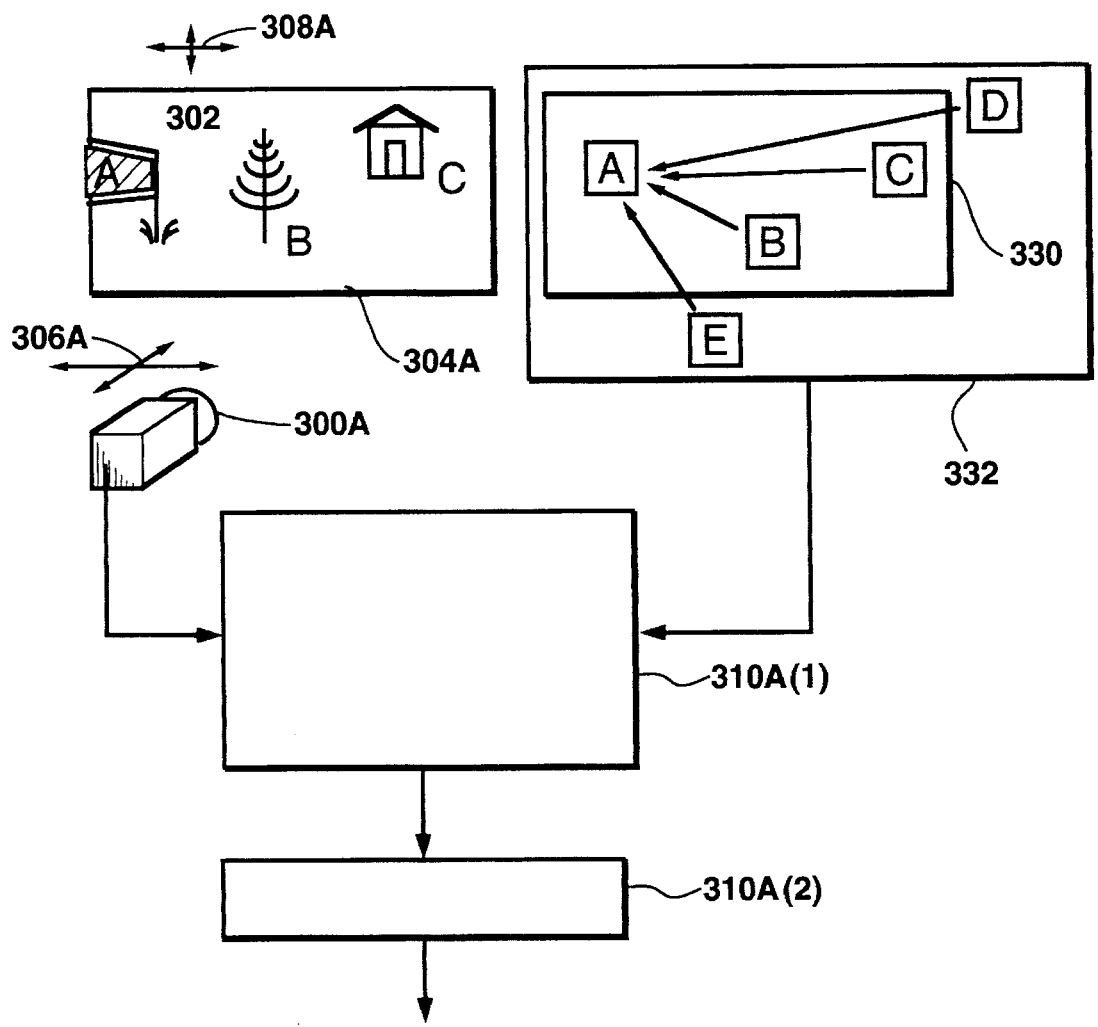
FIG. 6 shows an example of "landmark region tracking"

It is even more difficult to detect a pattern (target or landmark) that is leaving or entering the field of view in the background sequence, because only part of the pattern is visible when it enters or leaves the scene, so the pattern-detector has more difficulty in identifying the region. This problem can be solved using landmark region tracking since the landmark pattern could be in full view even though the target pattern is only partially in view or even if the target is totally absent from the current field of view. An example of landmark region tracking is shown in FIG. 6. In FIG. 6, background scene 304A consists of the current field of view of camera 300A. As indicated, the current field of view includes the target (billboard 302 comprising logo pattern "A") and landmarks B (a tree) and C (a house), with each of the target and landmarks being positionally displaced from one another. As indicated by blocks 330, the current field of view, and 332, the world map, the target A and landmarks B and C, comprising the current field of view 330 of a landmark region, form only a portion of the stored relative positions and poses of patterns of the world map 332 of the landmark region. These stored patterns also include landmarks D and E which happen to be outside of the current field of view of the landmark region, but may be included in an earlier or later field of view of the landmark region. Means 310A(1), responsive to inputs thereto from both camera 300A and block 332, is able to derive an output therefrom indicative of the location of target A whether pattern A is completely in the field of view, is partially in the field of view, or only one or more landmarks is in the field of view. Means 310A(1) detects pattern A by detecting pattern B and/or C and using world map 332 to infer the position of pattern A. The output from means 310A(1), the location of pattern A, is applied to means 310A(2), not shown, which estimates pose in the manner described above. The output of means 310A(2) is then connected to a video switch (not shown).

Landmark region tracking is also useful when the target itself happens to be occluded in the current field of view, so that its location must be inferred from the locations of one or more non-occluded landmarks.

Landmark region tracking will only solve the problem if the target pattern leaves or enters the field of view in a particular direction. In the example shown in FIG. 6, where each of the landmark patterns within the landmark region lies to the fight of the target pattern, landmark pattern tracking only solves the problem if the target pattern leaves the field of view on the left-hand-side of the image.

Multiple landmark tracking overcomes the problem. Instead of detecting a single landmark (or target) pattern, the means 210A of the system could choose to detect one or more landmark patterns within different landmark regions depending on which pattern(s) contributed most to inferring the position of the target pattern. For example, if the target pattern is leaving the field of view on the left-hand-side, then the system could elect to detect a landmark pattern towards the right of the target pattern. On the other hand, if the target pattern is leaving the field of view on the right-hand-side, the system could elect to detect a landmark pattern towards the left of the target pattern. If more than one landmark pattern is visible, the system could elect to detect more than one landmark pattern at any one time in order to infer the position of the target pattern even more precisely. As taught in the prior art, this system can be implemented using the results of pattern detection in a previous image in the background sequence to control pattern detection in the next image of the sequence. Specifically, the system uses the position of the landmark pattern that was detected in the previous image to infer the approximate positions of other landmark patterns in the previous image. These positions are inferred in the same way the position of the target pattern is inferred from a single landmark pattern. The system then elects to detect in the current image the landmark pattern that was nearest the target pattern in the previous image, and that was sufficiently far from the border of the previous image. As a result, when a detected landmark region becomes close to leaving the field of view of the background scene, the system elects to detect another landmark region that is further from the image border.

When a scene cut in the background sequence occurs, or when the system is first turned on, it has no (correct) prior knowledge of the locations of landmarks. When this occurs, the system can elect to search for all the landmark patterns throughout the whole image. Once landmarks have been detected in this way, the system can resume the procedure of directing the landmark search in the next frame using detection results from the current frame.

A problem with the implementation of basic landmark region tracking by means 210A is that a single, fixed difference vector is often not sufficient to characterize the pose relationship between the target pattern and the landmark pattern. For example, distortion at the periphery of the lens of the camera can make distances between features in the scene appear smaller or larger as the camera moves across the screen. For example, the distance between the target and landmark patterns might be 20 pixels when both patterns appear close to the image center, yet the distance might increase to 25 pixels when the patterns appear near the edge of the image. The problem is not just limited to changes in distance; changes in pose (scale, orientation and perspective distortion) can occur due to lens distortion, as well as differences in depths of the patterns in the scene. The result is that the position (and pose) of the target pattern is inferred incorrectly and video is inserted in the wrong place in the background scene. To overcome this problem, corrective-landmark-region tracking compensates for errors in the position and pose of the target pattern using the precisely located positions of the landmark patterns in the background sequence to predict lens-distortion and depth errors at the location of the target pattern. This tracking method includes the steps of:

a) computing the precise position and pose of each landmark region with respect to other landmark regions throughout the image sequence;

b) computing the position and pose of each landmark region with respect to other landmark regions using the same fixed difference vector throughout the image sequence;

c) subtracting b) from a) to determine the error in the simple difference vector model at each landmark region throughout the image sequence;

d) interpolating the error results recovered in c) to predict the error at the location of the target pattern assuming that errors vary smoothly between landmark regions; and e) subtracting the predicted error in position and pose at the target pattern from the original estimate of the position and pose to obtain a more accurate estimate of position and pose at the target pattern.

Technically the most challenging aspect of pattern key insertion is the detection of target and landmark patterns within the video sequences. Detection must be performed reliably and at video rate. One approach makes use of hierarchical structured search and hierarchical motion (registration) techniques. The following is a detailed description of an implementation of pattern-key insertion that uses these techniques.

Figure 7:
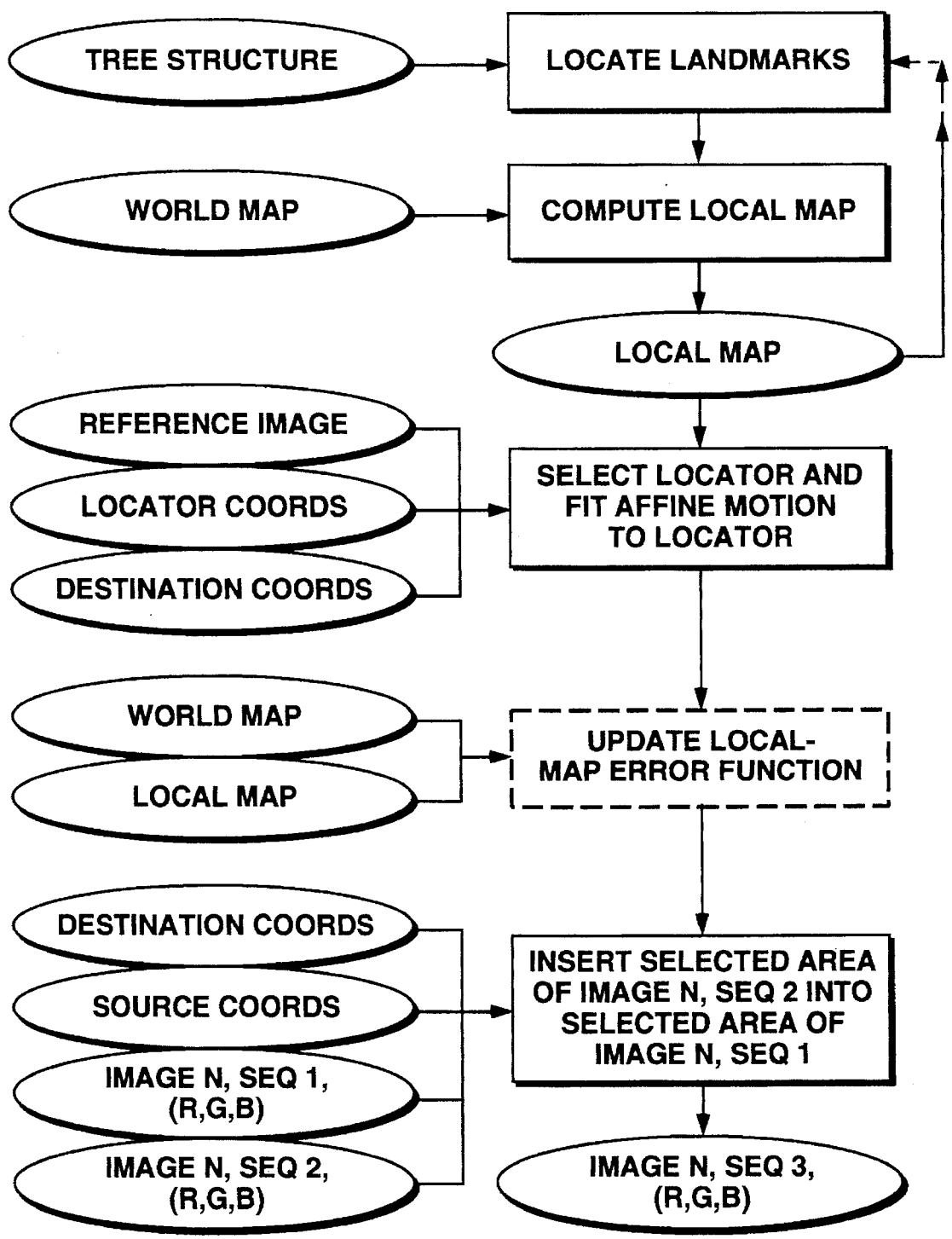
FIG. 7 illustrates the successive steps performed in implementing the pattern-key insertion technique of the invention.

In FIG. 7 the successive steps performed in implementing the pattern-key insertion technique of the invention are illustrated. Oval blocks correspond to data, and rectangular blocks correspond to processing modules. If 'N' is the image number in a sequence, then the diagram shows how image 'N' of the first source sequence (i.e., the A sequence derived from the background scene in FIGS. 2–5) is merged with image N of the second source sequence (i.e., the B sequence derived from the foreground scene in FIGS. 2–5) to produce image N of the destination sequence (i.e., the output scene sequence in FIGS. 2–5). There are 3 main components in the pattern-key insertion procedure. In FIGS. 2–5, these components comprise means 210A, means 210B and means 214. Means 210A performs the functions of landmark locator for the first source by detecting patterns in the background scene and (2) the pose estimator that estimate the pose of landmarks with respect to a reference image (or images) of the first source. Means 210B performs the functions of landmark locator for the second source by detecting patterns in the foreground scene and (2) the pose estimator that estimate the pose of landmarks with respect to a reference image (or images) of the second source. Means 214 is a geometric transform module that properly formats the video for insertion into the destination sequence. The landmark locator operation determines a coarse estimate of the location of LANDMARKS in image N, Sequence 1 (i.e., the first source sequence). The pose estimator determines a fine estimate of the location through a procedure that systematically registers image regions that have been called 'LOCATORS'. These two components are labeled 'Locate landmarks' and 'Select locator and Fit affine precise alignment to locator' respectively in FIG. 7. The final stage of the procedure actually inserts the video from the second source sequence into the first source sequence to produce the destination sequence.

The initial set-up procedures are separated into two parts: the image-specific-set-up, and the world-specific-set-up. They are separated because in the applications envisaged by the invention, it is expected that the world-specific set-up need only be performed once for a particular image scene. For example, the world-specific set-up might be performed and stored for a particular football field, and then retrieved the next time it is wanted to perform pattern-key insertion on any image sequence showing that particular football field. On the other hand, the image-specific-set-up is concerned with the position of inserted video in the image sequence.

In an image-specific-set-up, before the pattern-key insertion method begins, an operator has to define where in the first source sequence images are to be inserted (the target or DESTINATION region), and where the images will be inserted from in the second source sequence (the SOURCE region). The operator also has to define the position, size and shape of image landmarks and locators. To do this, a REFERENCE image is selected from the first source sequence that contains the destination region. For example, the operator may define the top-left hand corner of this image to be the origin of a world-coordinate system. The operator may define the target or destination region by recording the coordinates of the 4 corners of a closed, convex polygon that encloses the destination region. The four corners of logo pattern "A", in background scene 204A in FIGS. 2–5 defines such a polygon. This data is called the DESTINATION coordinate set. Similarly, the operator chooses a source position from an image in the Sequence 2 (i.e., the second source sequence) that is called the SOURCE coordinate set. Initially, it is assumed that there is no camera motion in Sequence 2 (which is the actual case in the foreground scene of FIG. 2), so that any image can be used to define the source coordinate set. Later, this constraint will be relaxed.

In the world specific set-up, the operator defines the position and size of the LOCATOR regions in the reference image by recording the coordinates of the 4 corners of a closed, convex polygon that encloses the locator region. At least one locator must be defined, but if more locators are defined, the robustness of the system is improved when locators move in and out of camera-view. At least one locator must be in full camera-view when the destination region is in partial or full camera-view if precise video insertion is to be achieved in all par s of the sequence. Typically, about 4 or 5 locator regions are defined that surround the destination region so that at least one locator is in full view of the camera as the destination region moves in or out of view.

The operator also has to choose image LANDMARKS that will be used in the first stage of the insertion procedure. In the pattern-key insertion of FIGS. 2 and 3, the location of these landmarks must remain fixed with respect to the world coordinate system while pattern-key insertion is being performed; therefore mobile landmarks (for example, cars and people) are not wise selections as landmarks. Good landmark selections might be the corners of a football stand, or the net supports on a tennis court. In FIG. 4 or 5 pattern-key insertion, where the target or destination region is on a moving object, the landmarks must appear on the same object on which the target or destination region appears. The operator must define at least one landmark, but if more landmarks are defined, then the robustness of the landmark locator module improves in the presence of landmark occlusion (mobile objects obscuring a landmark), and when landmarks move in and out of the field of view of the camera. In general, about 4 or 5 landmarks are defined that surround the destination region. This means that at least one landmark should be detected and tracked as the destination region comes into view. Landmarks need not only appear in the reference image; landmarks can be located in other images of the first source sequence, as long as their positions are expressed in world coordinates with respect to the reference image. The world coordinate position for each landmark is calculated using a simple planar world model. If it is assumed that landmark 1 is visible in the reference image, and that both landmark 1 and landmark 2 are present in a later image in the sequence, then the world coordinates of landmark 2 is equal to the world coordinates of landmark 1 added to the difference of the coordinates of landmark 2 and landmark 1 in the local coordinate system of the later image. This calculation can be repeated so that the world coordinates of any landmark in the sequence can be estimated, provided that two or more landmarks are visible in an image at all times.

Typically a set of landmarks is selected. The relative positions of these landmarks (as well as the location of locators) is recorded in a graph structure (labeled WORLD MAP in FIG. 7). In the hierarchical structured search procedure, the search begins with the most prominent landmark. This is typically represented at low resolution. The search then progresses at finer resolutions using results from coarser resolutions to guide the search. Such a search structure improves the efficiency of the landmark detector module. In FIG. 7, the set of coarse/fine images that records the reference 'template' for each landmark is called the TREE STRUCTURE.

Locate Landmarks is the first processing module of the pattern-key insertion technique shown in FIG. 7. For the first image in the first source sequence, the module takes each tree structure and searches throughout the image for each landmark. To increase processing efficiency, the search procedure first locates for each landmark the highest correlation match at a coarse resolution, that limits the search area for the landmark at successively finer resolutions. The output is a coordinate position (with respect to the current image) of each VISIBLE landmark in the image. If a correlation match is below a threshold, then the landmark is declared INVISIBLE and no coordinate position is returned. This might happen if a landmark is out of view, or if a landmark is occluded.

Now that the position of some landmarks with respect to the current image is known, that information can be combined with the world map to produce a LOCAL MAP. The local map is a file containing the estimated coordinates of all landmarks and locators (invisible or invisible) with respect to the current image. The local map is basically the world map shifted by the sum of the world coordinates of a detected landmark and the local coordinates of the detected landmark. Therefore, all landmark and locator positions in the local map are defined with respect to the top-left hand corner of the current image. In practice, it is desired to combine information from all detected landmarks to increase the precision of the position estimates. The uncertainty in the detected landmark positions is modeled to determine an optimal estimate of the positions of the other landmarks and locators. Specifically, a fixed uncertainty in detected position with respect to orientation and translational position is assumed for each landmark. Then it can be determined, using the world map, how these fixed uncertainties map onto the translation uncertainties for each undetected landmark. For example, a small uncertainty in the orientation of a detected landmark can result in a large uncertainty in the vertical position of an undetected landmark if the two landmarks are far apart horizontally. For each undetected landmark, therefore, there is an estimated position with associated uncertainty determined from each detected landmark. The position of the undetected landmark is estimated by determining the weighted average of the estimated positions, using the determined uncertainties as the weighting factors.

The coordinate dimensions of the current image are known, and the maximum speed of the camera motion (e.g., 20 pixels motion per frame) can be estimated, so that it can be predicted from the local map whether or not a landmark or locator might be visible in the next image of the sequence. For each landmark, we store this VISIBILITY prediction in the local map.

After the local map has been produced for the first image of the sequence, the local map is used to guide the landmark-locator module for the second image of the sequence. In this case, the landmark-locator module will only search for landmarks that are predicted as VISIBLE in the previous local map, and it will focus its search in the region surrounding the location of each of such landmarks in the previous local map. The width and height of this search region is controlled for each landmark by the estimated maximum speed of the camera motion and also the predicted uncertainty in the position of each landmark. This focused-search procedure dramatically improves processing efficiency.

If a scene change or scene cut occurs in the image sequence and no landmarks are detected within the focused search regions, then the system searches throughout the entire image for landmarks. If landmarks are still not detected, then it is assumed that a completely different world scene is being displayed, and the pattern-key insertion for that image is suspended. This means that sequences showing pattern-key insertion can be freely mixed with other sequences without any adverse affects on insertion quality.

The Select Locator and Fit Affine Precise Alignment module performs the second major operation of pattern-key insertion. The module first selects which of the several locator regions should be used to determine a precise image motion estimate. It is desired that a locator region that is close to the destination region be used because the motion of the locator will be used as an estimate of the motion of the destination region. On the other hand, it is desired to ensure that the locator region is fully visible so that the motion estimate is precise. The local map contains the estimated positions of the top-left hand corners of each locator, so that combining this information with the LOCATOR coordinate data set gives an estimate of the coordinates of each corner of each locator with respect to the current image. This is accomplished by choosing the locator that lies entirely within the image and has the smallest distance between the centers of gravity of the locator and destination region. If no locator region satisfies this condition, then the affine fitting module is aborted, and only the local map is used. The motion estimate that is used is the position of the locator that has the smallest distance between the centers of gravity of the locator and destination region.

If a locator region lies entirely within the image, then an affine precise alignment model between the locator region in the reference image is fitted and the current image, using the coordinates of the locator region in the local map as a first estimate of the motion. The affine precise alignment model is computed at a coarse resolution before refining the model at progressively finer resolutions. The result is a set of parameters that define the motion between the locator in the reference image and the locator in the current image. The affine precise alignment estimation process is described in more detail in the various prior-art publications set forth above.

In order to know where to insert video, the precise motion between the source region in the second source sequence and the destination region in the first source sequence needs to be determined. This is done by cascading the motion that was recovered from the affine precise alignment estimation procedure with the motions between the source, locator and destination regions that were determined from the coordinates of the corners of these regions. In particular, the following steps are performed:

* Source region→Locator in reference image: A motion estimate is determined between these regions by fitting an affine or quadric motion model to the 4 motion vectors determined from the 4 corner coordinates of each region. The same affine fitting procedure as the one mentioned previously is used for this purpose.

* Locator in reference image→Locator in current image: This result is already available from the affine precise alignment estimation module.

* Locator in current image→Destination region in current image: This motion is approximated as the affine or quadric motion estimate between these regions in the REFERENCE image. The same technique as the one mentioned previously is used for this purpose These motion estimates are cascaded to produce a single mapping estimate between the source region in the reference image and the destination region in the current image. Any error in the mapping arises from the third and last mapping procedure where it was assumed that the relative positions of the locator and destination region in the reference image are the same as the relative positions in the current image (i.e., a planar world model was assumed). Due to lens distortion and depth variations in the scene, this assumption is not always valid. However, in real-world scenes, it can be a good approximation, especially if the locator and destination regions are in close proximity in the current image. Moreover, the affine precise alignment estimation module gives information on the difference between the motion that was predicted using a planar world model (the initial motion estimate provided by the local map) and the actual motion that was measured. This information can be used to model the errors arising from the planar world assumption in order to refine the mapping estimate that has been previously determined. Because this error-function model has not yet been implemented, it is displayed in broken lines in FIG. 7.

Preferably the video is color video. In this case, all processing required for landmark detection and pose estimation of locators is performed on the luminance (brightness) component of a color image sequence. To insert color video into color sequences, each color component of the source video is inserted into the corresponding color of the destination video. For example, the source region of the red intensity image of the second source sequence is inserted into the destination region of the red intensity image of the first source sequence.

In practice, many video sequences are recorded in an interlaced NTSC format where each image of a sequence is comprised of 2 fields, each recorded at a 1/60th second time interval, such that every alternate, horizontal line of the image belongs to the same field. As a result, horizontal motion of the camera can result in motion between adjacent lines of the image. For example, a vertical line imaged by an interlace camera panning quickly in a horizontal direction will be recorded as a jagged, vertical line. There are two consequences of this problem for pattern-key analysis. First, interlace can distort the intensity patterns of landmarks and locators so that the landmark locator and affine fitting modules are less robust. Second, inserting video from the second source sequence with a different interlace distortion (or no distortion) to that in the first source sequence could result in unacceptable insertion results. For example, a fast moving camera would result in considerable interlace distortion throughout the image yet inserted video derived from a stationary camera would contain no interlace distortion, and it would appear synthetic and false.

One way to overcome these problems is to perform pattern-key insertion separately on the first and second fields of the image. In this case, separate reference images, locator coordinates and source coordinate data sets aide used, but the same tree structure, world map, local map and destination coordinate data sets are used. In the set-up procedure, locator coordinates and source coordinate data sets in one field are chosen, and the locator coordinates and source coordinates in the second field are determined by determining the affine precise alignment between each locator region in field 1 with the corresponding locator region in field 2. The same affine fit module is used that is used in the pattern-key insertion method. The result is a set of different (although proximate) locator and source coordinates that correspond to each locator in field 2 of the image sequence. Interlace distortion in sequence 2 is therefore replicated precisely in the inserted video sequence.

The result is a pattern-key insertion procedure that exactly replicates the image sequence that would have been observed if a physical 3-dimensional scene object in the first source sequence were replaced by another physical 3-dimensional scene object. In order to achieve this exact replication of the image sequence, the pattern-key insertion procedure should preferably simulate motion blurring.

The following generalizations may be made:

a) arbitrary shapes for the locator, source and destination regions can be used rather than the 4-sided, convex polygon.

(b) the source video can be merged with the destination video to smooth sharp brightness, transitions that may occur between the two video sources. Some merging will be necessary to produce band-limited, NTSC compatible signals. Multi-resolution merging may be used.

(c) illumination changes from, for example, lens vignetting that changes the light detected by the camera light-sensors as the camera pans across the screen can be included in processing the inserted inserted video to match the background (d) the results of the affine-fitting module can be used to refine the local map to increase the efficiency of the method.

(e) the pattern-key insertion method can be generalized to allow for camera zoom.

(f) a sophisticated pattern-key insertion system at a broadcasting studio could insert a pattern into a video sequence that is easily identified by a simpler pattern-key insertion system located at smaller broadcasting and cable outlets elsewhere.

(g) pattern key insertion systems can be cascaded together so that inserted video is superimposed on top of other inserted video.

(h) because pattern-key insertion can insert any standard video sequence, all current video manipulation techniques can be used to preprocess the inserted video sequence without any consequence on the pattern key insertion technique. For example, insertion of zoomed video; that is, video that increases in size within the destination region over time can be included.

(i) In the processing required for implementing pattern-key insertion, 3-d models of the scene may be used instead of the above-described 2-d affine models. While the pattern-key insertion technique of the invention will improve the quality of any video insertion currently performed by the color-key insertion technique, there are other applications that only the pattern-key insertion technique of the invention can perform. These other applications include:

a) inserting video into another image sequence recorded in an environment that cannot be controlled by the user.

b) automating animation techniques used to combine real-world sequences with animated sequences.

c) inserting advertisements on top of other advertisements or image features in a video sequence.

d) inserting a moving region within an image sequence into another moving region within the same image sequence. For example, the image of the umpire in a tennis match could be inserted on the scoreboard in the same tennis match.

It is to be understood that the apparatus and method of operation taught herein are illustrative of the invention. Modifications may readily be devised by those skilled in the art without departing from the spirit or scope of the invention. While the various embodiments have been described in terms of three dimensional physical objects, it is to be understood that objects can also include two dimensional physical objects, electronically generated images and other types of images which can be detected and/or recorded.

We claim:

1. In a sequence of successive 1-dimensional video image frames of a scene defined by its pictorial content, wherein each of said successive video image frames of said sequence is composed of a set of digital pixels, and wherein said scene may or may not include respective first subsets of pixels in at least some of said successive video image frames of said sequence that define a first pattern that may move in its relative location and change in its orientation in each of said successive video image flames of said sequence; the improvement in apparatus for replacing said respective first subsets of pixels defining said first pattern in video image frames of said sequence which include said first pattern with respective second sets of pixels defining a second pattern wherein none of said pictorial content of said scene is specified whereby said scene may be composed of any type of pictorial content rather than any part of said scene being unique; wherein said first pattern is an uncoded first pattern and said second pattern is an uncoded second pattern, and wherein said improved apparatus comprises:

first means responsive to the respective sets of pixels defining the video images manifested by said successive frames of said sequence that employs dynamic pattern recognition for detecting the relative location of said uncoded first pattern in those video image frames that do include said first pattern and for estimating the pose of said detected uncoded first pattern in accordance with those pixels defining said respective first subsets of pixels of said successive video image frames of said sequence, said first means comprising means responsive to said sequence of successive 1-dimensional video image frames derived from a camera view of at least one object, said one object defining said uncoded first pattern, and employing affine precise alignment to provide perspective transformation for estimating the pose of said detected uncoded first pattern with respect to said camera's view in each said sequence of successive 1-dimensional video image frames;

second means for geometrically transforming said respective second sets of pixels defining said uncoded second pattern using the pose estimate of said detected uncoded first pattern; and third means responsive to said detected uncoded first pattern for replacing said detected uncoded first pattern with said geometrically transformed uncoded second pattern.

2. In a sequence of successive 1-dimensional video image frames of a scene defined by its pictorial content, wherein each of said successive video image frames of said sequence is composed of a set of digital pixels, and wherein said scene may or may not include respective first subsets of pixels in at least some of said successive video image frames of said sequence that define a first pattern that may move in its relative location and change in its orientation in each of said successive video image frames of said sequence; the improvement in a method for replacing video image frames of said sequence which include said first pattern with respective second sets of pixels defining a second pattern wherein none of said pictorial content of said scene is specified, whereby said scene may be composed of any type of pictorial content rather than any part of said scene being unique; wherein said first pattern is an uncoded first pattern and said second pattern is an uncoded second pattern, and wherein said improved method comprises the steps of:

a) in response to the respective sets of pixels defining the video images manifested by said successive frames of said sequence, employing dynamic pattern recognition for detecting the relative location of said uncoded first pattern in those video image frames that do include said first pattern and estimating the pose of said detected uncoded first pattern in accordance with those pixels defining said respective first subsets of pixels of said successive video image frames of said sequence wherein step (a) is responsive to said sequence of successive 1-dimensional video image frames derived from a camera view of at least one object, said object defining said uncoded first pattern, and employs affine precise alignment to provide perspective transformation for estimating the pose of said detected uncoded first pattern with respect to said camera's view in each said sequence of successive 1-dimensional video image frames;

b) geometrically transforming said respective second sets of pixels defining said uncoded second pattern using the pose estimate of said detected uncoded first pattern; and c) in response to said detected uncoded first pattern, replacing said detected uncoded first pattern with said geometrically transformed uncoded second pattern.

3. In a sequence of successive 1-dimensional video image frames of a scene defined by its pictorial content, wherein each of said successive video image frames of said sequence is composed of a set of digital pixels, and wherein said scene may or may not include respective first subsets of pixels in at least some of said successive video image frames of said sequence that define a first pattern that may move in its relative location and change in its orientation in each of said successive video image frames of said sequence; the improvement in a method for replacing video image frames of said sequence which include said first pattern with respective second sets of pixels defining a second pattern wherein none of said pictorial content of said scene is specified, and said second pattern is a moving pattern and a predetermined portion of said moving second pattern constitutes a reference pattern whereby said scene may be composed of any type of pictorial content rather than any part of said scene being unique; wherein said first pattern is an uncoded first pattern and said second moving pattern is an uncoded second moving pattern, and wherein said improved method comprises the steps of:

a) in response to the respective sets of pixels defining the video images manifested by said successive frames of said sequence, employing dynamic pattern recognition for detecting the relative location of said uncoded first pattern in those video image frames that do include said first pattern and estimating the pose of said detected uncoded first pattern in accordance with those pixels defining said respective first subsets of pixels of said successive video image frames of said sequence;

b) geometrically transforming said respective second sets of pixels defining said uncoded second moving pattern using the pose estimate of said detected uncoded first pattern; and c) in response to said detected uncoded first pattern, replacing said detected uncoded first pattern with said geometrically transformed uncoded second moving pattern;

d) detecting said uncoded moving second pattern in said second scene and estimating the pose of said detected uncoded moving second pattern with respect to said reference pattern portion thereof, wherein step d) is responsive to said sequence of successive 1-dimensional video image frames defining said second scene and employs affine precise alignment estimation for estimating the pose of said detected uncoded moving second pattern with respect to said reference-pattern portion in said second scene; and said step (b) geometrically transforms said uncoded second moving pattern using the reference-pattern portion of said pose estimate of said detected uncoded moving second pattern as an origin to provide a stabilized transformed image of said uncoded second moving pattern with respect to the reference-pattern portion thereof, and using the pose estimate of said detected uncoded first pattern to geometrically transform said stabilized transformed image of said uncoded second moving pattern.

4. Apparatus for merging a portion of a first video image derived from a first video signal into a section of a second video image, the second video image being defined by a plurality of successive frames of a second video signal representing a scene, wherein the section of the second video image changes in at least one of orientation, scale and perspective in the plurality of frames, the apparatus comprising:

pattern recognition means for processing the second video signal to automatically identify images of a plurality of landmarks in each of the plurality of frames, the plurality of landmarks having a fixed spatial relationship in the scene represented by the second video image;

alignment means for automatically determining respective boundaries for the section in each of the plurality of frames of the second video signal with reference to the identified landmark images, wherein at least one of the images of the plurality of landmarks is outside of the determined boundaries in each of the plurality of frames;

geometric transform means for processing signals representing the portion of the first video image to geometrically transform the first video image to conform to the boundaries of the section of the second video image in orientation, scale and perspective in each of the plurality of frames of the second video signal; and switch means for substituting the processed first video signal representing the geometrically transformed portion of the first video image for a part of the second video signal defined by the determined boundaries to produce a signal representing the merged first and second video images.

5. A computer implemented method for merging a portion of a first video image derived from a first video signal into a section of a second video image, the second video image being defined by a plurality of successive frames of a second video signal representing a scene, wherein the section of the second video image changes in at least one of orientation, scale and perspective in the plurality of frames, the method comprising the steps of:

processing the second video signal to automatically identify images of a plurality of landmarks in each of the plurality of frames, the plurality of landmarks having a fixed spatial relationship in the scene represented by the second video image;

determining respective boundaries for the section in each of the plurality of frames of the second video signal with reference to the identified landmark images, wherein at least one of the images Of the plurality of landmarks is outside of the determined boundaries in each of the plurality of frames;

geometrically transforming signals representing the portion of the first video image in orientation, scale and perspective to conform to the boundaries of the section of the second video image in each of the plurality of frames of the second video signal; and substituting the processed first video signal representing the geometrically transformed portion of the first video image for a part of the second video signal defined by the determined boundaries to produce a signal representing the merged first and second video images.

* * * * *